United States Patent
Calderara et al.

(10) Patent No.: US 10,626,278 B2
(45) Date of Patent: Apr. 21, 2020

(54) ANTICORROSIVE COATING AND METHOD FOR OBTAINING SAME

(71) Applicant: INDUSTRIE DE NORA S.P.A., Milan (IT)

(72) Inventors: Alice Calderara, Milan (IT); Valentina Bonometti, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 24 days.

(21) Appl. No.: 16/063,417

(22) PCT Filed: Dec. 21, 2016

(86) PCT No.: PCT/EP2016/082142
§ 371 (c)(1),
(2) Date: Jun. 18, 2018

(87) PCT Pub. No.: WO2017/108928
PCT Pub. Date: Jun. 29, 2017

(65) Prior Publication Data
US 2019/0338147 A1 Nov. 7, 2019

(30) Foreign Application Priority Data
Dec. 21, 2015 (IT) .......... 102015000085656

(51) Int. Cl.
*C09D 5/08* (2006.01)
*C09D 127/18* (2006.01)
*C23C 18/12* (2006.01)
*C25B 9/00* (2006.01)

(52) U.S. Cl.
CPC ........... *C09D 5/084* (2013.01); *C09D 127/18* (2013.01); *C23C 18/1241* (2013.01); *C25B 9/00* (2013.01)

(58) Field of Classification Search
CPC .. C09D 5/084; C09D 127/18; C23C 18/1241; C25B 9/00
See application file for complete search history.

(56) References Cited

FOREIGN PATENT DOCUMENTS

| EP | 0397114 A1 | 11/1990 |
|---|---|---|
| EP | 0940828 A2 | 9/1999 |
| WO | 2013/174718 A1 | 11/2013 |

OTHER PUBLICATIONS

International Search Report and Written Opinion for International Application No. PCT/EP2016/082142 (dated Dec. 21, 2016) (8 Pages).

*Primary Examiner* — Hai Vo
(74) *Attorney, Agent, or Firm* — Lucas & Mercanti, LLP

(57) ABSTRACT

The invention relates to a coating for providing protection against interstitial corrosion for titanium surfaces such as flanges or other equipment used in highly aggressive electrolytic environments, for example hydrochloric acid electrolysis cells. The coating according to the invention comprises a passivating layer, on which a film of water-repellent material is applied. The invention further relates to a method for providing anticorrosive protection for flanges of electrochemical cells.

10 Claims, 1 Drawing Sheet

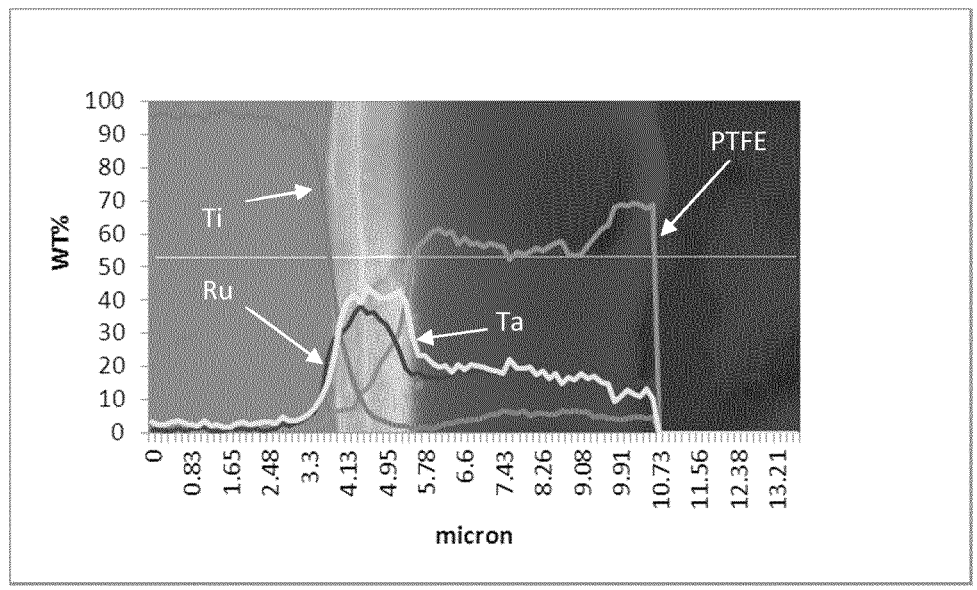

ANTICORROSIVE COATING AND METHOD FOR OBTAINING SAME

This application is a U.S. national stage of PCT/EP2016/082142 filed on Dec. 21, 2016 which claims the benefit of priority from Italian Patent Application No. 102015000085656 filed Dec. 21, 2015 the contents of each of which are incorporated herein by reference.

FIELD OF THE INVENTION

The invention relates to a coating for providing protection against interstitial corrosion for titanium surfaces such as flanges or other equipment used in highly aggressive electrolytic environments, for example hydrochloric acid electrolysis cells.

BACKGROUND OF THE INVENTION

Interstitial corrosion is a phenomenon that is well known in the electrochemical field. This occurs when components of electrolytic cells, for example chlor-alkali cells, made of titanium or titanium alloys, come into contact with solutions containing chloride ions.

The phenomenon of interstitial corrosion is a major problem in hydrochloric acid electrolysis cells. Electrolysis of hydrochloric acid is an electrochemical process that is receiving increasing interest, as hydrochloric acid is the typical by-product of all the major industrial processes using chlorine: increase in the production capacities of plants of modern design leads to the formation of large amounts of hydrochloric acid, marketing of which presents significant difficulties. The electrolysis of hydrochloric acid, typically carried out in electrolytic cells with two compartments separated by an ion-exchange membrane, leads to the formation of chlorine in the anode compartment, which can be recycled upstream, resulting in a substantially closed cycle, practically free from environmental impact. The constructional materials of the anode compartment must be able to withstand a highly aggressive environment resulting from the combination of acidity, moist chlorine and anodic polarization; for this purpose, for the constructional materials it is preferable to use valve metals such as titanium, niobium and zirconium, among which titanium, optionally alloyed, is the one most commonly used, for reasons of cost and ease of processing. For example, titanium alloys containing nickel, chromium and small amounts of noble metals such as ruthenium and palladium, such as the AKOT® alloy marketed by Kobe Steel, are widely used. The anodes on which anodic evolution of chlorine takes place consist for example of a substrate of valve metal, such as a titanium alloy, coated with a suitable catalyst capable of lowering the overpotential of the anodic discharge of chlorine, generally consisting of a mixture of titanium and ruthenium oxides. The same type of coating is also used as corrosion protection for some components of the anode compartment not involved in the evolution of chlorine, in particular in the zones that may constitute interstices subject to stagnation of electrolyte. Lack of sufficient exchange of electrolyte may in fact lead to local discontinuity of the passivating layer whose purpose is to protect the valve metal, triggering corrosion phenomena, which are more dangerous the more they are localized on small areas. The external flanges of the two compartments, anode compartment and cathode compartment, which are typically provided with sealing gaskets, are an example of cell zones subject to interstitial corrosion. In the most favourable cases encountered in industrial practice, titanium alloys coated with catalytic formulations based on oxides of ruthenium and titanium can guarantee continuous operation in hydrochloric acid electrolysis plants of between 24 and 48 months, before corrosion problems arise, which lead to loss of seal of the cell elements in the flange zone. The problem of protection of titanium surfaces present as equipment in chlor-soda diaphragm processes is tackled for example in EP0397114. EP0397114 describes the application of a monolayer structure comprising particles of a platinum group metal or an oxide thereof dispersed in a matrix of fluorinated polymer in a volume ratio of 1:2. In the solution proposed in EP0397114, the fluorinated polymer has the function of a binder, in which the electrically conducting particles are dispersed. In this special type of structure, electrical continuity between the catalytic particles is poor. The consequence of the lack of electrical continuity is failure to establish the passivation mechanism and hence protection of the titanium substrate. In the special structure described in EP0397114, moreover, the amount of polymer cannot be reduced as there would be inadequate mechanical stability of the structure itself. In order to improve the competitiveness of industrial processes for hydrochloric acid electrolysis, where the reaction environment is much more aggressive than in chlor-alkali cells, further increase in the useful life of these components becomes necessary.

SUMMARY OF THE INVENTION

Various aspects of the present invention are presented in the appended claims.

According to one aspect, the invention relates to an anticorrosive coating for substrates of valve metal or alloys thereof that comprises at least one passivating layer and at least one layer of hydrophobic polymer applied on said at least one passivating layer, said at least one passivating layer comprising a mixture of at least one oxide of at least one platinum group metal and at least one valve metal oxide, said at least one passivating layer having porosity that is partially occluded by said at least one layer of hydrophobic polymer applied on said at least one passivating layer. In fact, the inventors found that an anticorrosive coating comprising two layers, one passivating, anchored to the substrate, and one hydrophobic, anchored in its turn to the first passivating layer, provides an effective obstacle to penetration of corrosive liquid into the interstices. Moreover, the two-layer structure described above has the further advantage that in case of damage or removal of the polymer layer, the substrate surface is still protected by the first passivating layer, prolonging its life.

In one embodiment, the anticorrosive coating comprises 2-8 $g/m^2$ of said hydrophobic polymer.

In one embodiment, the layer of hydrophobic polymer of the anticorrosive coating according to the invention has a contact angle with water greater than 97°. The inventors observed, surprisingly, that the water-repellent properties of some polymers, for example polytetrafluoroethylene (PTFE), are sufficient to impede the penetration of corrosive substances into the interstices. Contrary to the normal use as an anticorrosive film in the prior art, which is of the order of millimetres, the polymer film applied on the first passivating layer according to the invention is very thin, of the order of a few microns.

In one embodiment, the hydrophobic polymer is a fluorinated polymer.

In one embodiment, the fluorinated polymer is polytetrafluoroethylene (PTFE).

In one embodiment, at least one oxide of at least one platinum group metal is a ruthenium oxide and at least one valve metal oxide is a tantalum oxide.

In one embodiment, the coating according to the invention has a passivating layer containing a loading of noble metal expressed as metallic ruthenium of between 1 and 4 g/m$^2$.

In one embodiment, the coating according to the invention is applied to a titanium or titanium alloy substrate.

In one embodiment the coating is applied to a titanium or titanium alloy flange of an electrolyser, optionally of a hydrochloric acid electrolyser.

According to another aspect, the invention relates to a method for preparing an anticorrosive coating as described above that comprises the following simultaneous or successive steps:
  application of a solution of compounds of ruthenium and tantalum to a substrate of valve metal in one or more coats, with subsequent thermal decomposition after each coat at a temperature between 450 and 550° C. for a time between 5 and 20 minutes and a final thermal treatment of 1-3 hours at a temperature between 450 and 500° C. until said passivating layer is obtained;
  application of an aqueous suspension of (fluorinated) polymer in one or more coats, followed by drying at a temperature between 40 and 80° C. for a time between 5 and 20 minutes after each coat and final thermal treatment at a temperature between 300 and 360° C. for a time between 5 and 15 minutes.

According to another aspect, the invention relates to a method for treating flanges of electrochemical cells comprising deposition of an anticorrosive coating as described above.

DESCRIPTION OF THE FIGURES

FIG. 1 shows a scanning electron microscope (SEM/EDAX) image of a sample prepared according to example 1, together with indication of the concentration profiles of the elements present. "PTFE" indicates the concentration profile of fluorine entirely attributable to the presence of PTFE.

The following examples are provided to demonstrate particular embodiments of the invention, the feasibility of which has been abundantly verified within the range of values claimed. A person skilled in the art will appreciate that the compositions and the techniques described in the following examples represent compositions and techniques for which the inventors found good functionality in practical application of the invention; however, in light of the present description, a person skilled in the art will appreciate that many changes may be made to the specific embodiments disclosed, while still obtaining a similar or analogous result, yet remaining within the scope of the invention.

EXAMPLE 1

A plate of AKOT® titanium alloy of dimensions 50 mm×50 mm was degreased with acetone in an ultrasonic bath and pickled in boiling 20% HCl for 15 minutes.

A passivating solution was obtained by mixing RuCl$_3$ at 20 wt % and TaCl$_5$ at 50 g/l in 10% hydrochloric acid.

The passivating solution was applied by brush in 4-5 coats with drying at 50° C. for 10 minutes and thermal treatment of decomposition at 500° C. for 5 minutes after each coat, until a deposit of oxides of tantalum and ruthenium was obtained with a total ruthenium loading of about 3 g/m$^2$. At the end of the thermal decomposition process, the plate underwent a further thermal cycle of 2 hours at 500° C.

A suspension of PTFE-31JR (60 wt %) from the Du Pont-Mitsui Fluorochemicals Company, Ltd., was diluted with deionized water and applied in three cycles of brushing and subsequent drying at 60° C. for 8 minutes after each coat with final thermal treatment of 15 minutes at 370° C. for a total loading of PTFE of 6 g/m$^2$. The sample thus produced, identified as 1, was characterized in the electron microscope; the composition of the passivating layer is indicated in Table 1, referring to FIG. 1.

TABLE 1

| Compounds | wt % |
| --- | --- |
| PTFE | 6.24 |
| Ru | 43.61 |
| Ti | 0.62 |
| Ta | 49.53 |

In particular, the fluorine profile identifies the presence of PTFE and demonstrates that PTFE has penetrated into the passivating layer. This penetration, permitted by the physiological porosity of the passivating layer, greatly increases the adhesion between the polymer layer and the passivating layer.

COUNTER-EXAMPLE 1

A plate of AKOT® titanium alloy of dimensions 50 mm×50 mm was degreased with acetone in an ultrasonic bath and pickled in boiling 20% HCl for 15 minutes.

A passivating solution was obtained by mixing RuCl$_3$ at 20 wt % and TaCl$_5$ at 50 g/l in 10% hydrochloric acid.

The passivating solution was applied by brush in 4-5 coats with drying at 50° C. for 10 minutes and thermal treatment of decomposition at 500° C. for 5 minutes after each coat, until a deposit of oxides of tantalum and ruthenium was obtained with a total ruthenium loading of about 3 g/m$^2$. At the end of the thermal decomposition process, the plate underwent a further thermal cycle of 2 hours at 500° C. The sample thus produced was identified as C1.

EXAMPLE 2

The two samples 1 and C1 were submitted to a corrosion test that simulates the conditions of interstitial corrosion that may occur on the flanges of electrolysers for the production of chlorine or in other shielded zones. The first series of samples was immersed in a known volume of 20 wt % HCl at 45° C. under a nitrogen stream, to simulate conditions of electrolyte stagnation. At the end of the 80-hour test, the solution was analysed to determine the concentration of chromium and nickel released from the substrate. The results are given in Table 2.

TABLE 2

| sample # | Type | Chromium | Nickel |
| --- | --- | --- | --- |
| 1 | RuTa + PTFE | 0.024 | 0.05 |
| C1 | RuTa | 0.1 | 0.25 |

The foregoing description is not intended to limit the invention, which may be used according to various embodiments without deviating from the stated aims, the scope of which is defined unambiguously by the appended claims.

In the description and in the claims of the present application, the word "comprise" and its variations such as "comprising" and "comprises" do not rule out the presence of other additional elements, components or process steps.

Discussion of documents, deeds, materials, apparatus, articles and the like is included in the text for the sole purpose of supplying a context for the present invention; however, it is not intended that this material or part thereof should constitute general knowledge in the field relating to the invention before the priority date of each of the claims appended to the present application.

The invention claimed is:

1. An anticorrosive coating for valve metal substrates or alloys thereof comprising
    at least one passivating layer, and
    at least one layer of a hydrophobic polymer applied on said at least one passivating layer,
said at least one passivating layer comprising a mixture of at least one oxide of at least one platinum group metal and at least one valve metal oxide, the valve metal oxide comprising tantalum oxide, titanium oxide, niobium oxide or zirconium oxide,
said at least one passivating layer having a porosity partially occluded by said at least one layer of hydrophobic polymer applied on said at least one passivating layer, and wherein said hydrophobic polymer is a fluorinated polymer.

2. The coating according to claim 1 comprising 2-8 g/m$^2$ of said hydrophobic polymer.

3. The coating according to claim 1 wherein said at least one layer of hydrophobic polymer has a contact angle with water greater than 97°.

4. The coating according to claim 1 wherein said fluorinated polymer is polytetrafluoroethylene.

5. The coating according to claim 1 wherein said at least one oxide of at least one platinum group metal is a ruthenium oxide and said at least one valve metal oxide is a tantalum oxide.

6. The coating according to claim 5 wherein said passivating layer contains a loading of ruthenium expressed as metal in a range from 1 to 4 g/m$^2$.

7. The coating according to claim 1, wherein said valve metal substrate is titanium or titanium alloy.

8. The coating according to claim 7 wherein said substrate of titanium or titanium alloy is a flange of an electrolyser.

9. A method for preparing the anticorrosive coating according to claim 1 comprising:
    applying a solution of ruthenium and tantalum compounds to the valve metal substrate in one or more coats with drying and thermal decomposition after each coat at a temperature of from 450 to 550° C. for a time between 5 and 20 minutes and a final thermal treatment for 1-3 hours at a temperature from 450 to 500° C. to obtain said passivating layer; and
    applying an aqueous suspension of a hydrophobic polymer in one or more coats with drying at a temperature from 40 to 80° C. for a time between 5 and 20 minutes after each coat and final thermal treatment at a temperature from 300 to 360° C. for a time between 5 and 15 minutes.

10. A method of retrofitting of a flange of an electrochemical cell comprising depositing the anticorrosive coating according to claim 1 to the flange of the electrochemical cell.

* * * * *